United States Patent [19]
Koepfli

[11] 4,069,887
[45] Jan. 24, 1978

[54] STEERABLE DRIVE SHAFT
[75] Inventor: Josef Koepfli, Wil, Switzerland
[73] Assignee: Inventio AG, Hergiswil, Switzerland
[21] Appl. No.: 768,490
[22] Filed: Feb. 14, 1977
[30] Foreign Application Priority Data
Feb. 17, 1976 Switzerland .................. 1889/76
[51] Int. Cl.$^2$ ............................................. B60K 17/30
[52] U.S. Cl. .................................. 180/44 R; 180/43 R
[58] Field of Search ................ 180/43 A, 43 R, 44 R, 180/43 B, 43 C, 44 M, 44 E, 44 F, 45, 47, 48

[56] References Cited
U.S. PATENT DOCUMENTS

| 3,157,395 | 11/1964 | Budzinski et al. | 180/43 R |
| 3,580,350 | 5/1971 | Arkus-Duntor | 180/44 R |
| 3,703,215 | 11/1972 | Takahaski | 180/43 R |

Primary Examiner—Joseph F. Peters, Jr.
Assistant Examiner—Donn McGiehan
Attorney, Agent, or Firm—Werner W. Kleeman

[57] ABSTRACT

Steerable drive shafts for motor vehicles as a general rule use double-universal joints by means of which the wheels can be driven. With such type drive shafts the angle between the drive shaft and the power-takeoff shaft of a universal joint is limited, since otherwise overloading or destruction of the joint can occur. In order to obtain with the largest possible angular disposition between the drive and power-takeoff shafts a large deflection or turning of the wheels, the drive shaft or axle, according to the invention, comprises two parts which can be connected by means of a single-universal joint. The single-universal joint is disposed at the longitudinal center line of the vehicle, at a certain spacing in front of the connection line and between both double-universal joints.

3 Claims, 1 Drawing Figure

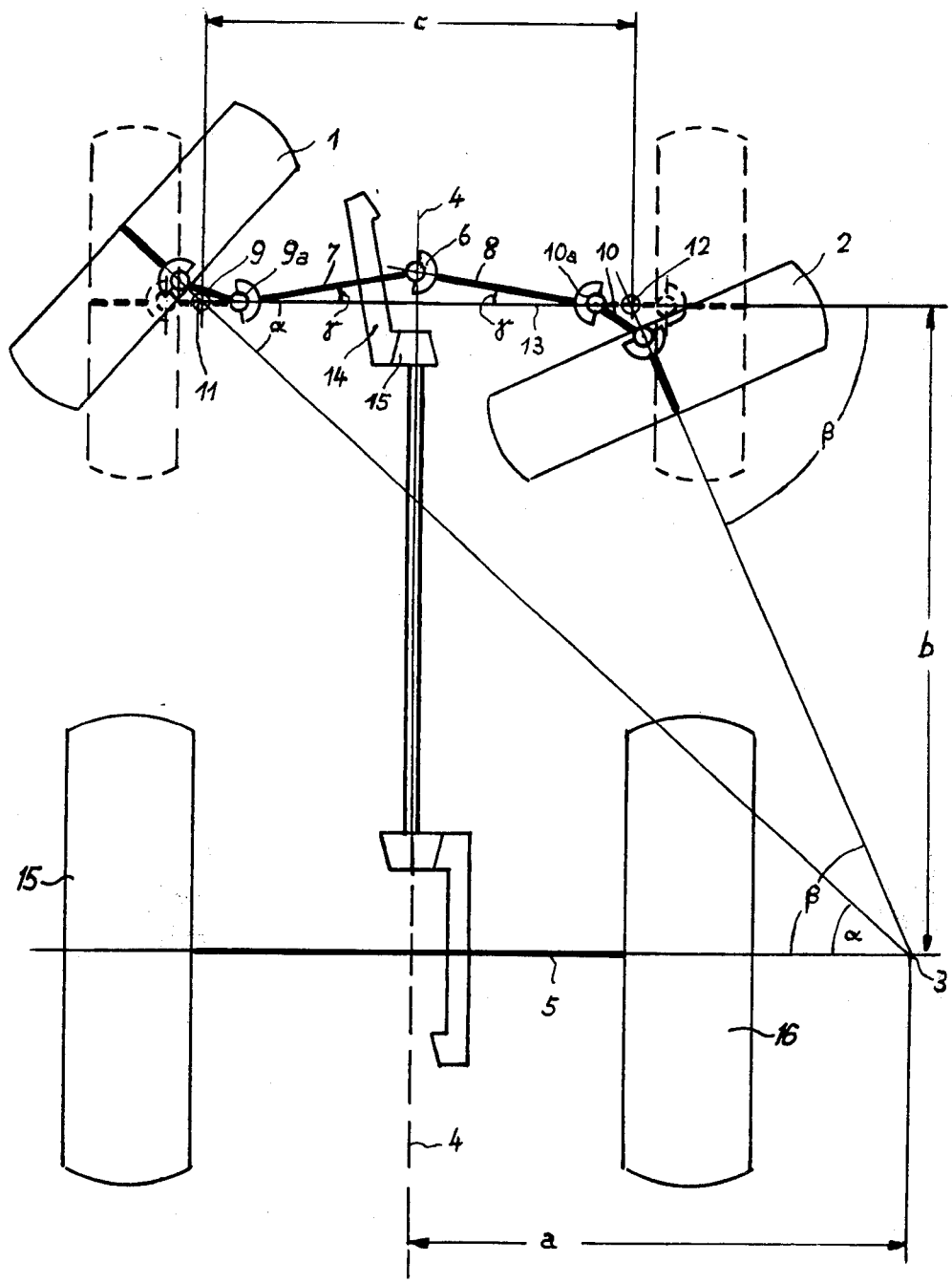

STEERABLE DRIVE SHAFT

BACKGROUND OF THE INVENTION

The present invention relates to a steerable drive shaft for motor vehicles equipped with wheels each driven by a double-universal joint.

With heretofore known constructions of vehicles having front-wheel drive or four-wheel drive (all-wheel drive), the drive of the wheels is accomplished from an axle drive shaft, both ends of which are connected with the double-universal joints. Since, however, the angular position between the drive shaft and the power-takeoff shaft of a universal joint is only possible up to a certain degree, because otherwise the universal joint will become overloaded or damaged, limits are set for the steering deflection or turning of the wheels when using a steerable drive shaft of this type.

In the case of vehicles where the front axle is not driven it has already been possible to obtain extremely small turning circles or radii and thus an extremely favorable maneuverability of the vehicle. This is especially desirable for tractors. However when the front axle or shaft is driven difficulties exist in attaining such small turning circles, for the above mentioned reasons.

In order to obtain as large as possible deflection or turning angles at a steerable drive shaft for motor vehicles having wheels driven by an axle drive shaft through the agency of a respective double-universal joint, it has already been proposed to incorporate in each case between the double-universal joint and the axle drive shaft a further single-universal joint and to connect such via a connection shaft with the double-universal joint, and each connection shaft encloses an angle with the axle drive shaft. The entire arrangment is carried out such that the angular disposition of both double-universal joints remains the same notwithstanding the different size deflection or turning angles of the wheels. In this regard it is to be appreciated that with larger turning or steering deflections, especially in the case of vehicles having a small spacing between the axles, such as encountered with tractors, the wheel located at the inside of the curve must be turned much more intensely than the wheel located at the outside of the curve, and while otherwise the double-universal joint located at the inside of the curve would limit the steering deflection, it was possible with this proposed construction to achieve the result that the angular disposition of the double-universal joint located at the inside of the curve is smaller in relation to the turning angle of the wheel by the aforementioned angle, which the axle drive shaft and the connection shaft enclose with one another, and the angular position of the double-universal joint located at the outside of the curve is larger by the mentioned angle in relation to the turning or deflection angle of the wheel, so that there can be completely utilized the previously mentioned limited angular positioning of both double-universal joints.

Yet, the previously described prior art construction, in contrast to the former conventional steerable drive shafts, requires the installation of two further universal joints. This considerably increases the cost of the construction, because the axle drive shaft must be divided and connected with flanges in order to install them in the axle housing and to be able to connect them with the centrally located differential.

SUMMARY OF THE INVENTION

Hence, it is a primary object of the present invention to provide an improved steerable drive shaft which is not associated with the aforementioned drawbacks and limitations of the prior art proposals.

Another and more specific object of the present invention contemplates obtaining a considerable reduction in the production costs by simplifying the construction of a steerable drive shaft, and as concerns the utilization of the angular positioning or angling of both double-universal joints the same result should be achieved.

An additional object of the present invention is to provide an arrangement of the character described wherein it is possible to obtain a still further reduction in the spacing between the axles or shafts of the front and rear wheels, which arrangement is of significance for tractors intended to be coupled with harvesting machines and equipped with such type drive shafts, and which spacing of the axles could not heretofore be made smaller due to the position of the front differential housing which was governed by space considerations.

Now in order to implement these and still further objects of the invention, which will become more readily apparent as the description proceeds, the steerable drive shaft for motor vehicles and having wheels driven by means of a respective double-universal joint, is manifested by the features that a further single-universal joint is arranged at the longitudinal center line of the vehicle and in spaced relationship from the connection line extending through the inner joints of the double-universal joint. This single-universal joint is coupled by means of a respective drive shaft with the double-universal joints. These drive shafts in each case enclose with the aforementioned connection line an angle of the same magnitude at both sides of the vehicle center line. The angle between each drive shaft and the connection line extending through the inner joints of the double-universal joints is preferably equal to one-half of the difference between the different size deflection or turning angles of both wheels with maximum turning or deflection thereof. In this case the angular disposition of both double-universal joints at the inside of the curve and the outside of the curve is the same with maximum turning of the wheels.

Furthermore, one of the drive shafts is preferably driven by a double helical gear arrangement or miter gearing consisting of a pinion and spur bevel gear, wherein the axes of the pinion and the spur bevel gear arranged upon said one drive shaft intersect one another at an angle which is smaller than 90° by the difference of the aforementioned angle enclosed between such drive shaft and the connection line.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE schematically illustrates an exemplary embodiment of the invention.

DETAILED DESCRIPTION OF THE PREFERRED EMBODIMENTS

Describing now the drawing, in the single FIGURE there is schematically illustrated a vehicle chassis of, for instance, a tractor having a four-wheel or all-wheel drive. The front wheels 1 and 2 of the tractor are turned or deflected towards the right, so that the tractor can travel through a curve about the curve center point 3. This curve center point 3 is located at a spacing $a$ from the vehicle center or longitudinal center line 4 upon the extension of the rear shaft or axle 5. The spacing of the axles between the front wheels 1, 2 and rear wheels 15, 16 has been designated by reference characters $b$ and the wheel spacing by reference character $c$.

A single-universal joint 6 is arranged at the region of the front axle at the vehicle center line 4. Extending from such single-universal joint 6 are two drive shafts 7 and 8 which drive the double-universal joints 9 and 10, by means of which there are driven in turn the wheels 1 and 2. A connection line 13 extends through the joints 11 and 12 of both wheels 1 and 2 formed by the axle journals or steering knuckles and at the same time through the inner joints 9a and 10a of both double-universal joints 9 and 10. Both of the drive shafts 7 and 8 together with the connection line 13 enclose an angle $\gamma$. The single-universal joint 6 is located in front of this connection line 13 at the vehicle center line 4, and it is for this reason that the angle $\gamma$ is of the same magnitude at both sides thereof. With a deflection or turning angle $\alpha$ of the wheel 1 located at the outside of the curve and a considerably larger deflection or turning angle $\beta$ of the wheel 2 located at the inside of the curve the magnitude of the angle $\gamma$ preferably amounts to $\frac{1}{2}(\beta-\alpha)$, i.e. is equal to one-half of the difference of the different turning or deflection angles of both wheels with maximum deflection, because then the angular disposition or angling of both double-universal joints 9 and 10 at the outside of the curve and the inside of the curve is the same with maximum wheel deflection, as will be apparent from the showing of the drawing. If, for instance, the turning or deflection angle $\beta$ of the wheel located at the inside of the curve amounts to 60° and the turning or deflection angle $\alpha$ of the wheel located at the outside of the curve amounts to 44°, then the angle $\gamma = 8°$, i.e. one-half of the difference between 60° and 44°. In other words: by virtue of this arrangement the angular disposition or angling of the double-universal joint 10 located at the inside of the curve becomes smaller in relation to the turning angle of the wheel 2 by the angle $\gamma$ and the angular dispositon or angling of the double-universal joint 9 located at the outside of the curve in relation to the turning angle of the wheel 1 becomes larger by the angle $\gamma$. In this way the possible angular disposition of both double-universal joints is completely utilized.

The drive shaft 7 located at the left side is driven by a spur bevel gear 14 which meshes with a pinion 15. With this miter or bevel gear arrangement the axes of the pinion 15 and the spur bevel gear 14 intersect at an angle which is smaller than 90° by the difference of angle $\gamma$ i.e. is equal to 90°-$\gamma$.

A further advantage which is realized from the described construction resides in the fact that the axle spacing $b$ between the front wheels 1, 2 and rear wheels 15, 16 is smaller if one starts from the position of the front axle-differential, not shown in the drawing, but located at the position of the universal joint 6, through which there would extend a non-angled straight drive shaft, and the position of such differential is fixed for reasons of space. Due to the angled drive shafts 7 and 8 the front wheels therefore can be positioned somewhat further towards the rear in comparison to their position when using a straight drive shaft.

While there are shown and described present preferred embodiments of the invention, it is to be distinctly understood that the invention is not limited thereto, but may be otherwise variously embodied and practiced within the scope of the following claims.
ACCORDINGLY,

What I claim is:

1. A steerable drive shaft for motor vehicles having wheels driven through the agency of a respective double-universal joint, comprising:
    a pair of wheels each of which is arranged to one respective side of the longitudinal center line of the vehicle;
    a respective double-universal joint provided for each wheel of said pair;
    each of said double-universal joints includes an inner and an outer joint;
    a single-universal joint arranged substantially at the longitudinal center line of the vehicle and in spaced relationship forwardly of a connection line extending through the inner joints of the double-universal joints;
    a respective drive shaft for connecting said single-universal joint with each of the double-universal joints;
    each of said drive shafts enclosing, with said connection line, an angle which is of the same magnitude at both sides of the longitudinal center line of the vehicle.

2. The drive shaft as defined in claim 1, wherein:
    said angle between each drive shaft and the connection line extending through the inner joints of the double-universal joint is equal to one-half of the difference between the different size deflection angles of both wheels with maximum turning of said wheels.

3. The drive shaft as defined in claim 1, further including:
    gear means for driving one of said drive shafts;
    said gear means comprising a pinion and a spur bevel gear;
    each of said pinion and spur bevel gears having a respective axis;
    the axes of the pinion and the spur bevel gear intersecting at an angle which is equal to 90° less said enclosed angle.

* * * * *